Patented Oct. 13, 1936

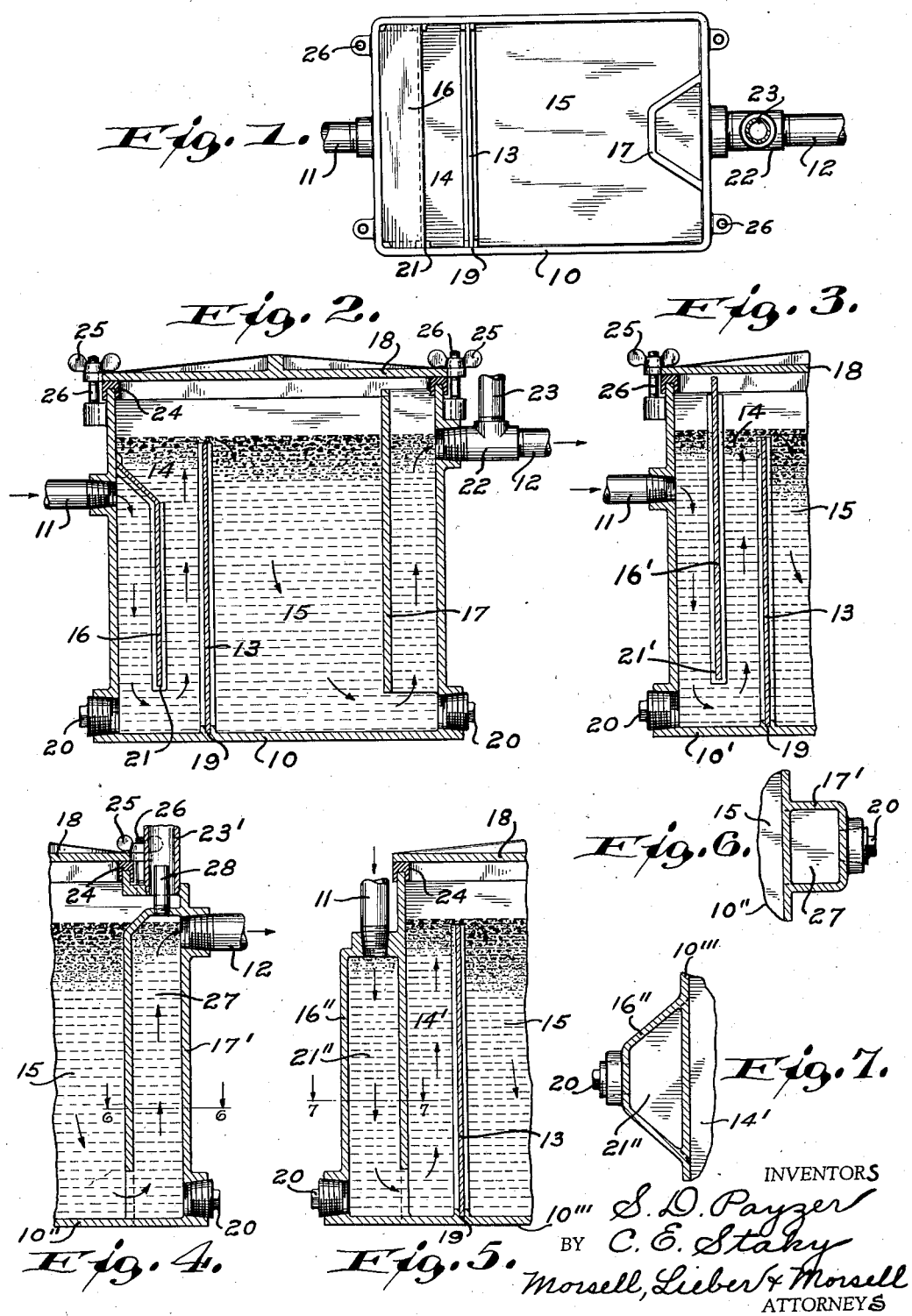

2,057,203

UNITED STATES PATENT OFFICE 2,057,203

GREASE TRAP

Stanley D. Payzer and Carl E. Staky, Wausau, Wis., assignors to D. J. Murray Manufacturing Co., Wausau, Wis., a corporation of Wisconsin Application March 20, 1935, Serial No. 12,001

2 Claims. (Cl. 210—56)

The present invention relates in general to improvements in the art of separating fluent substances having different specific gravity, and relates more specifically to improvements in the construction and operation of traps for removing greases or the like from waste liquid delivered from sinks, dish-washing machines, etc.

Generally defined, an object of the invention is to provide a simple and compact grease trap structure, which is automatic and highly efficient in operation.

Because of the fact that the specific gravity of grease such as is ordinarily carried in suspension by waste water from sinks or the like, is only about one-tenth less than unity, or equal to approximately .9, it is important in attempting gravity separation, to avoid undesirable agitation of the mixture so that the grease will have an opportunity to float. The waste water should therefore be admitted to the separating chamber and removed therefrom, with minimum turbulence or disturbance. The gravity separating chamber should also have relatively large surface area and great depth so as to insure prolonged travel of the grease particles through the quiescent liquid and thus provide ample time for gravity to act. The admission of the grease laden mixture should preferably be at the top of the separating compartment in order to permit free grease to remain at the top and float away from the inlet; and the final discharge for the separated liquid should be effectively vented so as to permit escape of noxious gases and to prevent undesirable siphonage of liquid from within the trap. While many grease trap structures have heretofore been proposed, all of these prior devices have proven objectionable due to the omission of proper means for meeting all of the foregoing desirable requirements.

It is therefore a more specific object of the present invention to provide an improved grease trap which in fact meets all of the foregoing requirements and which has proven highly successful in actual commercial operation.

Another specific object of the invention is to provide a separator structure wherein the mixture of grease and water is admitted to and the separated water is conducted away from the separating chamber without disturbances of any kind, thereby insuring most effective gravity separation.

A further specific object of the invention is to provide a gravity separator having a separating chamber of relatively great depth and having extended surface area, thereby permitting the force of gravity to act in a most efficient manner.

Still another specific object of the invention is to provide a separator assembly in which the waste liquid is admitted to the top of one side of the gravity separating chamber, and wherein the separated water is discharged from the bottom of the opposite side of this chamber, so that the floating grease will tend to remain at the top remote from the water outlet.

An additional specific object of the invention is to provide improved structure for insuring effective venting of a grease trap so as to permit free escape of noxious gases and to prevent undesirable siphonage of liquid from the separating chamber.

Another specific object of the invention is to provide a grease trap which may be readily constructed, and all parts of which are conveniently accessible for inspection and cleaning.

These and other objects and advantages will be apparent from the following detailed description.

A clear conception of several embodiments of the invention, and of the mode of constructing and of utilizing grease traps built in accordance with the improvement, may be had by referring to the drawing accompanying and forming a part of this specification in which like reference characters designate the same or similar parts in the various views.

Fig. 1 is a top view of one type of the improved grease trap, with the cover thereof removed so as to show internal structure;

Fig. 2 is a central vertical section through the grease trap of Fig. 1, showing the same in action.

Fig. 3 is a central vertical section through the inlet end of a modified type of grease trap;

Fig. 4 is a central vertical section through the discharge end of a further modified type of grease trap;

Fig. 5 is a central vertical section through the inlet end of still another modified type of grease trap;

Fig. 6 is a transverse section through the modification of Fig. 4, taken along the line 6—6; and Fig. 7 is a transverse section through the modification of Fig. 5, taken along the line 7—7.

While the improvements have been shown and described herein as being specifically applied to a grease trap especially adapted for cooperation with sinks, dish-washing machines, or the like, it is not the intent to thereby unnecessarily restrict the scope of the invention.

Referring to Figs. 1 and 2 of the drawing, the improved grease trap shown therein comprises in general a main substantially rectangular casing 10 having an inlet pipe 11 connected to the upper portion of one end wall thereof and also having a discharge pipe 12 communicating with an upper portion of the opposite end wall thereof; a substantially upright partition 13 dividing the interior of the casing into inlet and separating chambers 14, 15 respectively and providing a weir or dam between these chambers; a flow diverting wall 16 extending centrally into the inlet chamber 14; another flow diverting wall 17 extending into the separating chamber 15 near the outlet or discharge pipe 12; and a removable cover 18 for the main casing 10.

The main casing 10 is shown as being formed of cast metal, but may be formed in any other suitable manner, and this casing preferably has considerable width transversely of the direction of flow therethrough, and also has substantial depth from the top of the dam or partition 13 to the bottom of the wall 17. The partition 13 is preferably removably mounted on a groove 19 formed in the side walls and bottom of the casing 10, and the lower portions of the chambers 14, 15 may be provided with drainage and cleanout plugs 20 which coact with the end walls of the casing 10. The diverting wall 16 of Figs. 1 and 2 is also mounted for removability in recesses 21 formed in the side walls of the casing 10, and forms a hood over the inlet opening at the pipe 11. The other diverting wall 17 of Figs. 1 and 2, is cast integral with casing 10 and extends above the liquid level but is spaced from the cover 18, and the lower ends of both of the walls 16, 17 are spaced some distance from the bottoms of the chambers 14, 15.

The outlet or discharge pipe 12 of Figs. 1 and 2, is connected to a vent fitting 22 which is in turn connected to the casing 10, and has a vent pipe 23 leading upwardly therefrom. The cover 18 coacts with the upper edge of the casing 10 through a flexible seal 24 preferably formed of rubber, and is detachably clamped in position by means of wing-nuts 25 coacting with studs 26, or in any other suitable manner. It is to be noted that when the cover 18 has been removed, the upper ends of the chambers 14, 15 are freely accessible for the removal of accumulated grease, and the partition 13 and diverting wall 16 may also be withdrawn upwardly from their normal retaining grooves 19, 21.

During normal operation of the grease trap of Figs. 1 and 2, the waste liquid ordinarily comprising a mixture of grease and water, is admitted to the upper end of the inlet chamber 14 from the supply pipe 11 and is immediately diverted downwardly by the wall 16 being caused to simultaneously spread laterally and thereby having its velocity considerably reduced. After passing to the lower end of the wall 16, the mixture rises gradually and without turbulence, and flows over the elongated upper edge of the partition 13 into the separating chamber 15 in the form of a relatively thin and unagitated sheet. During the gradual ascent of the mixture within the chamber 14, some of the grease particles are separated, and of these some particles remain and accumulate directly in the upper end of the chamber 14, while others are carried over the dam and gently float away from the latter into the upper portion of the separating chamber 15 as shown in Fig. 2. The remaining liquid flowing over the weir, gradually descends through the relatively large area and great depth of the chamber 15, and during this descent, the greater portion of the remaining grease particles, gravitate upwardly and accumulate at the top of the separating chamber. The separated liquid subsequently flows upwardly through the relatively restricted end passage formed by the wall 17, and is eventually discharged by gravity through the vent fitting 22 and delivery pipe 12 at approximately the same level as that of the liquid within the chambers 14, 15. Any gases which may escape from the waste liquid passing through the trap, will escape over the wall 17 and through the vent pipe 23, and the grease which accumulates within the trap may be periodically withdrawn upon removal of the cover 18. It is to be noted that the separation is effected automatically and continuously, and is moreover efficiently accomplished by virtue of the entire elimination of undesirable disturbances in the flow and the low velocity prevailing during the separation period.

The modified trap inlet structure shown in Fig. 3 differs from that of Figs. 1 and 2, primarily in the formation of the wall which causes the reversal of flow of the liquid through the inlet chamber 14. In this modification, the wall 16' is formed as a plane sheet and is removably mounted in straight recesses 21' formed in the side walls of the casing 10'. The wall 16' however preferably terminates a slight distance below the lower surface of the cover 18 in order to permit gases to escape thereover toward the vent. Except for the fact that some grease particles may accumulate in front of the wall 16' as well as on the opposite side thereof, the modified trap of Fig. 3 will operate in precisely the same manner as that of Figs. 1 and 2.

The modified trap outlet structure illustrated in Figs. 4 and 6, differs from that of Figs. 1 and 2, mainly in the formation of the wall at the delivery end of the separating chamber, and the venting arrangement. In this second modification, the main casing 10" is provided at the discharge end of the separating chamber 15, with an outer wall 17' forming an upwardly extending passage 27 the lower end of which is in open communication with the chamber 15 and the upper end of which communicates directly with the outlet pipe 12. A main vent pipe 23' communicates directly with the space above the chamber 15, and an auxiliary vent 28 connects the upper end of the passage 27 with the interior of the main vent. Otherwise, the trap structure of this modification, is the same as in Figs. 1, 2 or 3, and the operation of this second modified grease trap is precisely the same as previously described in connection with Figs. 1 and 2.

The modified trap inlet structure disclosed in Figs. 5 and 7, differs from that of Figs. 1, 2 and 3, principally in the formation of the inlet chamber. In this third modification, the main casing 10''' is provided at its inlet end with an outer wall 16'' forming a downwardly directed passage 21'' the lower end of which is in open communication with the inlet chamber 14' and the upper end of which communicates with the inlet pipe 11. The passage 21'' cooperates with the inlet chamber 14' to provide a single flow reversing chamber in advance of the partition 13 the same as in Figs. 2 and 3, and the normal operation of this third modification is again the same as that described in connection with Figs. 1 and 2.

While the several modifications of Figs. 3 to 7 inclusive constitute structures which function substantially the same as the grease trap illustrated in Figs. 1 and 2, they may facilitate construction of the traps. For example, the straight partition 16' of Fig. 3 may be more readily constructed than the bent partition 16 of Fig. 2. The formation of the passages 27, 21'' of Figs. 4 and 5 may facilitate casting of the main casings. It will be apparent, however, that these modifications in structure do not materially affect the normal operation of any of the devices specifically illustrated, and that further modifications might also be introduced without departing from the present invention.

From the foregoing description, it will be apparent that the present invention provides a simple and compact grease trap structure which is automatic and highly efficient in normal operation. The formation of the inlet chamber 14 besides materially decreasing the velocity of the entering mixture, permits initial gravity separation of some of the grease particles, and also insures delivery of the remaining liquid to the separating chamber 15. The relatively spacious and deep formation of the separating chamber 15, insures most effective separation of the grease, and the provision of the final upwardly directed discharge passage communicating with the separating chamber, provides a barrier for preventing undesirable escape of grease particles through the final outlet 12. The separation takes place with minimum turbulence and agitation, and is therefore most effective, and the accumulated grease can be readily removed from the trap by merely displacing the cover 18. The vent arrangements maintain the grease in sweet condition and prevent the same from becoming rancid and sour by preventing gases from accumulating over the bed of grease within the trap; and the plugs 20 provide means for effectively draining and cleansing the interior of the apparatus. Since the grease recovered with traps of this kind have considerable commercial value, and fresh sweet grease demands a higher price than stale, rancid or sour grease which may even be unsalable, this venting feature is quite important. The provision of a vent is also important in preventing undesirable siphonage of liquid grease from within the trap and thereby destroying its utility, and when the trap is operating normally the vent obviates danger of such undesirable siphonage. The improved structure may be readily constructed at minimum cost and requires minimum attention after proper installation. The apparatus furthermore meets all requirements for sanitation and safety, and can be installed in conjunction with any standard plumbing system for conducting waste liquid from a source of supply.

It should be understood that it is not desired to limit this invention to the exact details of construction herein shown and described, for modifications within the scope of the claims may occur to persons skilled in the art.

It is claimed and desired to secure by Letters Patent:—

1. A grease trap comprising, a casing forming a separating chamber having an inlet at one end and an outlet for liquid at its opposite end, a partition forming a dam within said chamber between said inlet and said outlet, means forming a liquid discharge conduit connecting the lower portion of said chamber beyond said dam with said outlet, a large vent pipe extending upwardly from said chamber in vertical alinement with said conduit, and a vent pipe of smaller diameter extending upwardly directly from said conduit and within said large vent pipe.

2. A grease trap comprising, a casing forming a separating chamber having an inlet at one end and an outlet for liquid at its opposite end, a partition forming a dam within said chamber between said inlet and said outlet, means forming a liquid discharge conduit connecting the lower portion of said chamber beyond said dam with said outlet, and a pair of concentric vents disposed above said conduit, one of said vents communicating directly with said chamber and the other connecting the upper portion of said conduit directly with said first mentioned vent.

STANLEY D. PAYZER.
CARL E. STAKY.